J. T. O'NEILL.
SAFETY BRAKE.
APPLICATION FILED JUNE 28, 1911.
1,028,596.
Patented June 4, 1912.
2 SHEETS—SHEET 2.
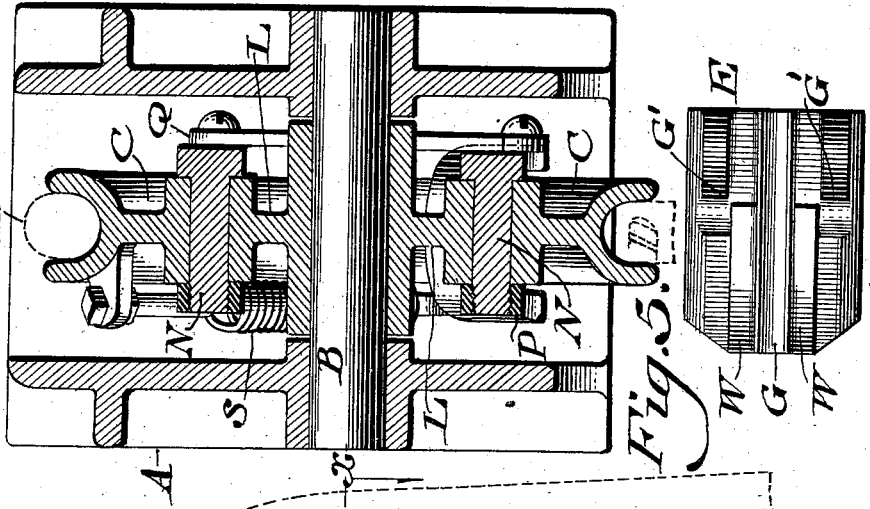
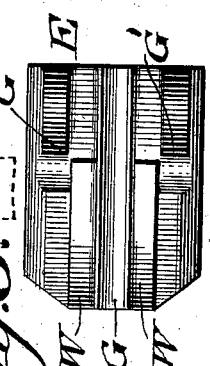
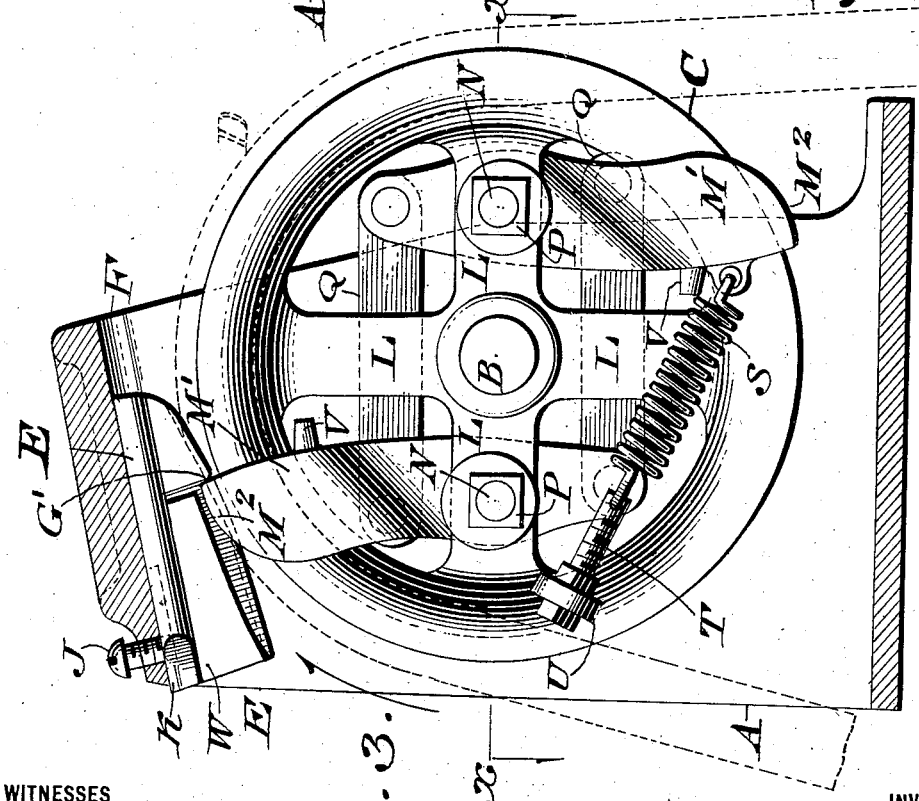
WITNESSES
P. F. Nagle
L. Douville
INVENTOR
John T. O'Neill.
BY
ATTORNEYS

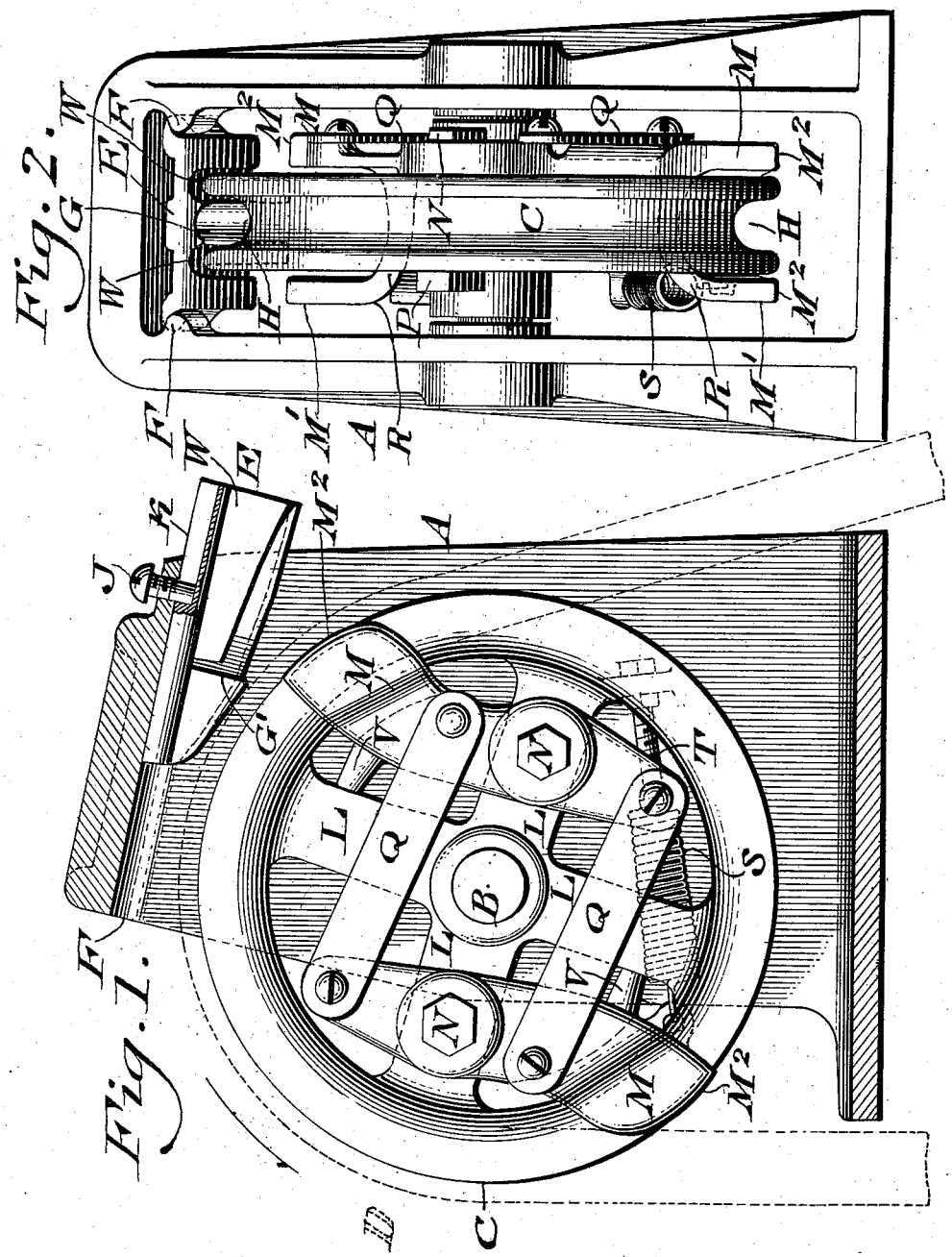

UNITED STATES PATENT OFFICE.

JOHN T. O'NEILL, OF PHILADELPHIA, PENNSYLVANIA.

SAFETY-BRAKE.

1,028,596.  Specification of Letters Patent.  Patented June 4, 1912.

Application filed June 28, 1911. Serial No. 635,855.

*To all whom it may concern:*

Be it known that I, JOHN T. O'NEILL, a citizen of the United States, residing in the city and county of Philadelphia, State of Pennsylvania, have invented a new and useful Safety-Brake, of which the following is a specification.

My invention consists of a safety device or brake for an elevator, the running gear of a vehicle, a motor, etc., the same embodying a pulley, sheave, or shaft, means adapted to rotate the same, a wedging shoe on the housing of said pulley, and a dog mounted on said pulley and normally at rest, whereby in the event of said pulley rotating excessively or running away, due to the breakage of movable parts of the elevator, etc., the throw-out of gears of the same, or the inability to control the mechanism or machinery involved, said dog is thrown out by centrifugal force and caused to engage said shoe, so as to remove the latter from its normal position, and brake the pulley, etc., or said rope, etc., is gripped or wedged between said pulley and shoe so that as it constitutes a member of the driving or operative machinery or mechanism of an elevator, the running gear of a vehicle, a motor, etc., said machinery or mechanism will be stopped and the safety of the elevator, etc., assured.

Figures 1 and 3 represent side elevations of partly in section of opposite sides of a safety device embodying my invention. Fig. 2 represents an elevation at a right angle to Fig. 1. Fig. 4 represents a diametrical section on line $x$—$x$ Fig. 3. Fig. 5 represents a face view of the shoe employed.

Similar letters of reference indicate corresponding parts in the figures.

Referring to the drawings:—A designates a housing which is stationarily mounted on a suitable base and within which is mounted by the axle B, the pulley C around which is passed the rope, cable or chain D shown in dotted lines, and which is operated by any suitable means, say by a movable member of an elevator, the running gear of a vehicle, a motor, etc., and so causes the rotation of the said pulley.

The tops of the side members of the housing are joined and covered by a cap which extends from one member to the other solid with the same. Suspended from said cap and adapted to enter the same is the slidable shoe E which has a wedge shape inner face, it being supported on and guided by the ways F, on the inner wall of said housing, the under face of said shoe having therein a longitudinally-extending groove G which is adapted to be in line with the groove H of the pulley C, said shoe in its normal position being removed from said groove H, as shown in Fig. 1, which position it assumes by gravity owing to the inclined nature of the ways F and the consequent inclination of said shoe, it being retained in said position by the screw J which engages the top wall of the housing A and has its point portion adapted to enter the longitudinally extending groove K on the back of the shoe.

In the under wall or face of the shoe E intermediate of the ends thereof are the shoulders G′, for a purpose to be hereinafter described.

On the spokes L of the pulley C are mounted the dogs M M′ which are secured to said spokes by the bolts N which form the axes of the dogs and are retained in place by the nuts P. In the present case there are two pairs of dogs one pair being on each side of the pulley, the members of one pair M being coupled by the links Q whose ends are pivotally connected with the heel ends of said dogs. Each member of the other pair M′ is connected with a counterpart member of the first named pair of dogs by the arms R, which are passed freely through spaces between the spokes of the pulley C as most plainly shown in Fig. 2, each arm and counterpart member of the opposite dog in the present case being cast together in one.

Connected with the dogs M is the spring S which is connected also with the bolt T which is fitted in the ear U on the pulley C by which provision also the tension of said spring may be adjusted, the object of the spring being to retain the dogs M, M′ in their normal position when their noses M² or outer ends do not project beyond the periphery of the pulley C, and so are removed from the inner face of the shoe E, both as clearly shown in Fig. 1.

The operation is as follows:—The cable, etc., being an operative member of an elevator, etc., communicates its motion to the pulley as has been stated. Under normal conditions, the dogs controlled by the spring remain at rest, but should the rope cause the pulley to rotate at excessive speed or run away, the dogs are thrown out by centrifugal force, so that their noses extend beyond the periphery and advance toward and ride under the shoe so as to abut with and hold tightly against the shoulders thereon when the shoe is moved or caused to slide over the cable, etc., and the shoe tightens itself against the same with a wedging action by which means the cable, etc., is clamped, or interlocked with the pulley and shoe, and is controlled against further motion, thus quickly and effectively stopping the pulley and consequently the elevator, etc., of which the cable, etc., is a member. When the shoe is forced back to full extent, the dogs are released and so return to their normal position due to the action of the spring S, the cable, etc., is thus disengaged from the shoe and it is free to be operated and transmits its power to the pulley as before. The return motions of the dogs are limited by the stops V which project laterally from the sides of said dogs and are adapted to abut against the adjacent portions of the spokes L for evident purposes, as will be apparent from Fig. 1.

In the wedging action of the shoe on the cable, etc., the top wall of the housing forms a firm support for the same during the severe upward strain to which it is subjected while clamping and holding the cable, it being noticed that the back of the shoe is adapted to ride on said wall during its sliding motions and to be seated thereagainst, in the operative position of the shoe.

In cases where the pulley is not operated by the flexible member D, but may be connected in any suitable manner with an engine or other motor so as to be rotated by the latter I adapt the shoe to be brought into contact with said pulley so as to act as a brake therefor. For this purpose said shoe is formed on its underside with brake members W which have inclined faces adapted to engage the periphery of said pulley when said shoe is advanced by the dogs, said members wedging or jamming with said periphery and so serving to stop and control the rotation of the pulley as in the previous case. It will be seen also that when the shoe is in engaging position with the pulley or the flexible member thereon, the jaws are held stationarily engaged against the shoe, thus providing additional means for locking said pulley and preventing rotation of the same.

Having thus described my invention what I claim as new and desire to secure by Letters Patent, is:—

1. In a safety device, a revoluble member, a housing having a cap joining the top of the same, means adapted to rotate said revoluble member, a shoe dependingly supported from and slidingly mounted in said housing and oppositely movable means movably mounted on the revoluble member and adapted by centrifugal action to ride against said shoe and move the same into sliding engagement with the said cap and cable and cause the shoe to control the revoluble member and consequently stop the same.

2. In a safety device of the character stated, a revoluble member, a flexible member adapted to rotate the same, a dog mounted on said revoluble member, a housing for said member having a cap, a movably mounted wedging shoe supported on said housing and beneath said cap and having a projection adapted to be engaged by said dog by centrifugal action of the latter to slide said shoe against said cap and the member to wedgingly hold the latter.

3. In a safety device of the character stated, a revoluble member, means for rotating the same, a housing for said revoluble member having a cap at the top thereof, a sliding shoe supported by said housing, a dog on said revoluble member, means held in the cap and engaging said shoe to limit its movement and a spring connected with said revoluble member and dog for controlling the latter in its normal position, said dog being adapted by centrifugal action to engage a surface of and tighten against and move said shoe wedgingly against said cap and said revoluble member.

4. In a safety device of the character stated, a revoluble member, means for rotating the same, a housing for said revoluble member, said housing having a cap, a slidably mounted shoe supported by said housing, and movable beneath said cap, a dog on said revoluble member, means held in the cap and engaging said shoe to limit its movement, a spring connected with said revoluble member and dog for controlling the latter in its normal position, said dog being adapted by centrifugal action to engage a surface of and tighten against and move said shoe wedgingly against said cap and revoluble member, and means on said cap and dog for limiting the return movements thereof.

5. In a safety device of the character stated, a pulley, a flexible member adapted to rotate the same, a housing for said pulley, said housing having a cap thereon, a movable shouldered shoe supported on said housing, a dog mounted on said pulley, a resilient device connected with said pulley and dog for retaining the latter in normal position disengaged from said shoe, said dog being adapted by centrifugal action on the abnormal rapidity of rotation of said pulley to engage the inner face of said shoe and abut the shoulder thereon, thereby wedgingly engaging said shoe with said cap and said flexible member and controlling the latter and means on the dog for engaging a member of said pulley to limit the return movement of the dog.

6. In a safety device, a revoluble member, a housing therefor, said housing having a cap thereon, means adapted for rotating said revoluble member, a shoe slidably mounted on the housing and having upon its inner face a groove and a shoulder and a dog pivotally mounted on the revoluble member and adapted by centrifugal action to enter said groove and engage said shoulder to tighten said shoe on said cap and wedgingly force the former, against said rotating means.

7. In a safety device, a stationary housing, the same having a cap thereon, a revoluble member, means for operating the latter, a dog pivotally mounted on said member and adapted to be actuated by centrifugal action, a movable shoe mounted on said housing adapted to be placed in the path of said dog and adapted to be directed by the latter wedgingly toward said means, and a stop member on said cap adapted to engage said shoe to limit the latter in its return motion from said revoluble member.

JOHN T. O'NEILL.

Witnesses:
JOHN A. WIEDERSHEIM,
N. BUSSINGER.

---

Copies of this patent may be obtained for five cents each, by addressing the "Commissioner of Patents, Washington, D. C."